UNITED STATES PATENT OFFICE.

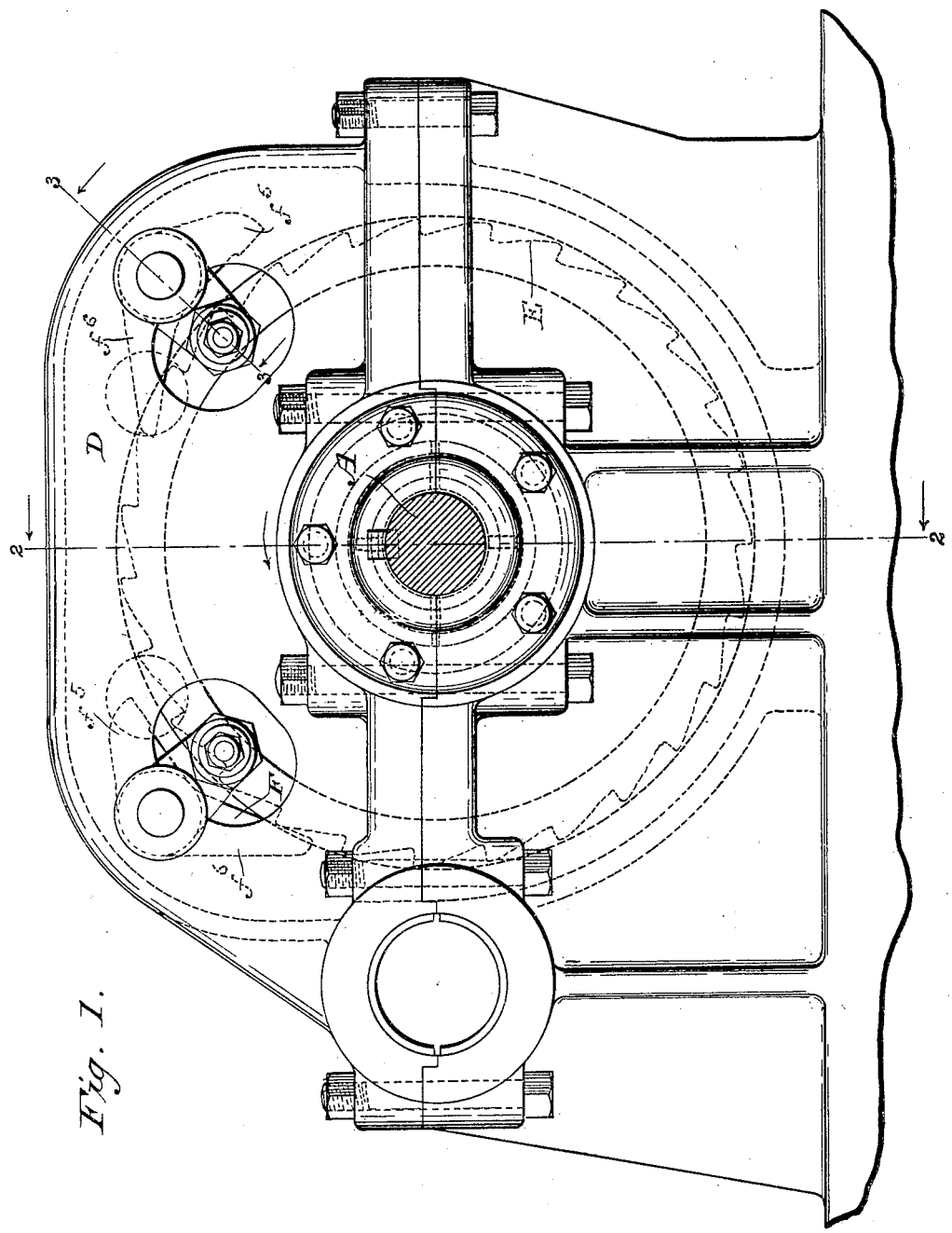

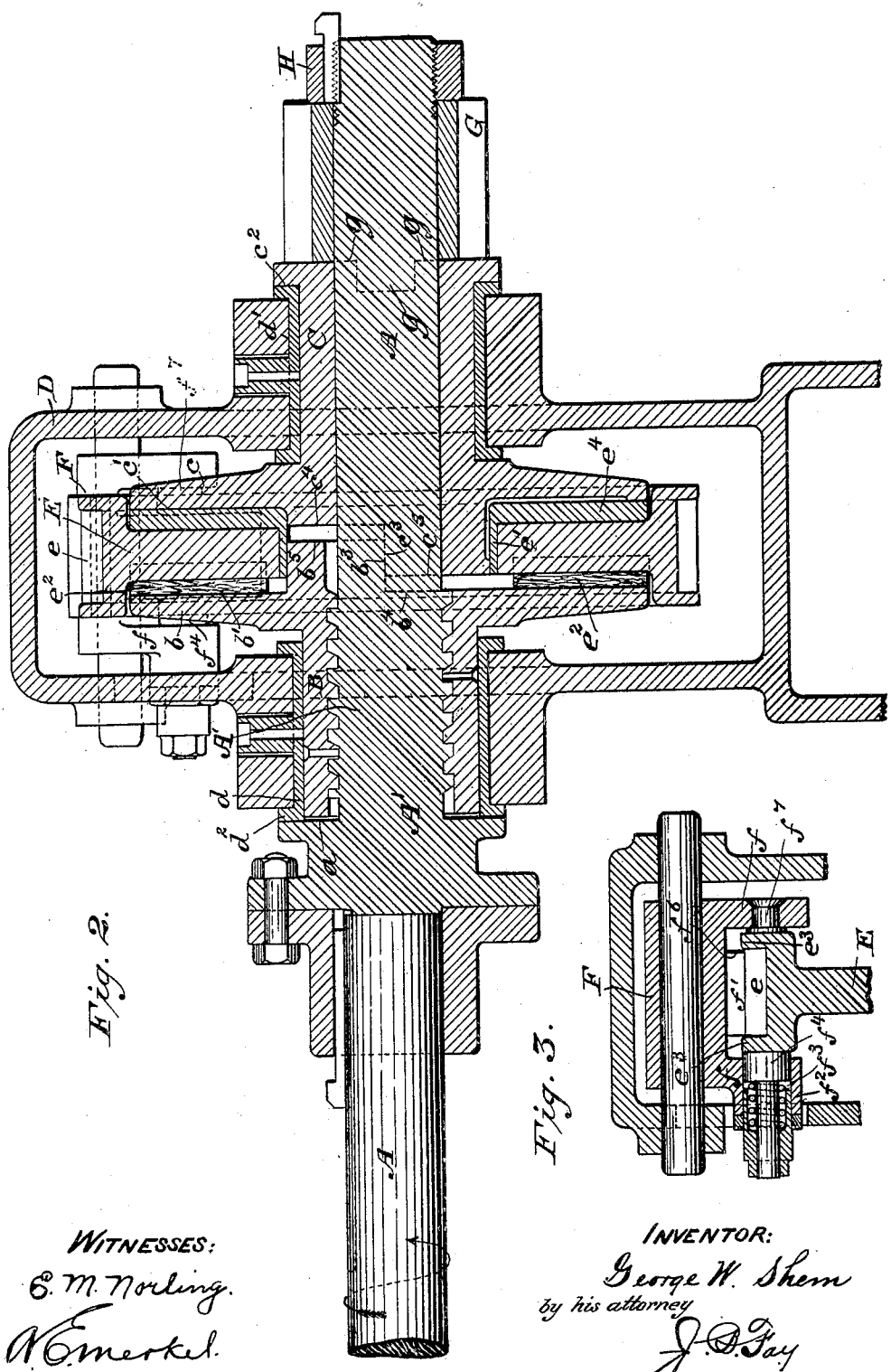

GEORGE W. SHEM, OF ALLIANCE, OHIO, ASSIGNOR TO THE ALLIANCE MACHINE COMPANY, OF ALLIANCE, OHIO, A CORPORATION OF OHIO.

AUTOMATIC BRAKE.

No. 810,227.　　　　　Specification of Letters Patent.　　　　　Patented Jan. 16, 1906.

Application filed August 29, 1904. Serial No. 222,537.

*To all whom it may concern:*

Be it known that I, GEORGE W. SHEM, a citizen of the United States, and a resident of Alliance, county of Stark, and State of Ohio, have invented a new and useful Improvement in Automatic Brakes, of which the following is a specification, the principle of the invention being herein explained and the best mode in which I have contemplated applying that principle, so as to distinguish it from other inventions.

My invention relates to automatic brakes, and particularly to that class of the latter which is designed for use on electrically-operated hoisting mechanisms.

Said invention consists of means hereinafter fully described, and specifically set forth in the claims.

The annexed drawings and the following description set forth in detail certain mechanism embodying the invention, such disclosed means constituting but one of various mechanical forms in which the principle of the invention may be used.

In said annexed drawings, Figure 1 represents an end view of mechanism embodying my invention, taken from the left of Fig. 2. Fig. 2 represents a vertical axial section of the same, taken upon the plane indicated by the line 2 2, Fig. 1; and Fig. 3 represents a section taken through one of the pawls and adjacent parts upon the plane indicated by the line 3 3, Fig. 1.

Said mechanism embodies a driving-shaft A, which is designed to be connected either directly or indirectly to the armature of an electric motor and which may be positively driven in either of its two directions of rotation. A portion A' of this driving-shaft is provided with a right-handed thread, Fig. 2, and upon this threaded portion is mounted an internally-threaded member or sleeve B, formed with a flange $b$, having an inner friction-face $b'$, lying in a plane perpendicular to the axis of rotation of the driving-shaft. Journaled upon a cylindrical portion of the driving-shaft is a second member C, formed with a flange $c$, similar to the flange $b$, and, like the latter, lying perpendicular to the axis of the driving-shaft. This flange $c$ is provided with a friction-face $c'$, Fig. 2, oppositely disposed to the friction-face $b'$. A frame or housing D is provided with suitable bearings $d\,d'$, in which said members B and C are mounted. The member C is provided with a second flange $c^2$, smaller than flange $c$, which, in conjunction with flange $c$, fixes such member C longitudinally of the axis of rotation of the driving-shaft. The members B and C are respectively formed with two opposing faces $b^3\,c^3$, respectively parallel with the axis of driving-shaft A, and with two shoulders $b^4\,c^4$, respectively located oppositely to the inner ends $c^5\,b^5$ of the members C and B, these opposing shoulders and faces $b^4\,c^4\,c^5\,b^5$ terminating interiorly with the axis of the driving-shaft.

Intermediately of the two flange-faces $b'$ and $c'$ is located a disk or ratchet-wheel E, whose periphery is provided with ratchet-teeth $e$ and which is journaled upon a central sleeve $e'$, integral with a bronze friction-disk $e^4$, which is fixed relatively to the ratchet-wheel and is located between the flange $c$ and said ratchet-wheel. Said sleeve $e'$ rests upon the interlocking portions of the members B and C. Intermediately of the ratchet-wheel E and the flange-face $b'$ is located a second friction-disk $e^2$, which is preferably a wooden disk. The said wooden and bronze disks form friction-surfaces which are adapted to be engaged by the flange-faces $b'$ and $c'$, respectively, in the manner and for the purpose hereinafter fully described.

Mounted in the frame D are two silent pawls F F, which are adapted to engage the teeth $e$ of the ratchet-wheel E and prevent the movement of the latter in one direction of rotation of the shaft and permit its rotation in the other direction. Each pawl is provided with an arm $f$, formed with a recess $f'$, into which projects the periphery of the ratchet-wheel, Fig. 3. One side of said arm $f$ is provided with a boss $f^2$, which is formed with a bore $f^3$. In this bore is mounted a small plunger $f^4$, which is adapted to be actuated inwardly, so as to frictionally engage the lateral opposing surface of the ratchet-wheel. In the other side of said arm $f$ is mounted a stud $f^7$, adapted to frictionally engage the ratchet-wheel on the side opposite to that upon which the plunger $f^4$ engages the same, the engagement of said plunger and stud upon opposite sides of the ratchet-wheel providing a balanced pressure, as will be understood. A suitable engaging portion $f^6$ is provided centrally of the pawl F, Fig. 3, which is adapted to engage the interdental spaces of the ratchet-wheel. The teeth $e$ of the ratchet-wheel are laterally inclosed by two flanges $e^3$, Fig. 3, and an extension $f^5$ of the pawl, Fig. 1, is adapted to ride upon these flanges $e^3$. By means of this construction it will be seen that when the ratchet-wheel is rotated in the direction of the arrows, Figs. 1 and 2, the frictional engagement of the plunger $f^4$ and stud $f^7$ therewith will lift the pawl F and cause the same to become disengaged from the ratchet-wheel. Such disengaging movement is limited, however, by the engagement of the extension $f^5$ with the flanges $e^3$.

Connected with member C, so as to rotate therewith, by means of intermeshing teeth $g$, Fig. 2, is a pinion G, which is loosely mounted upon the end of the driving-shaft A, so that the latter may rotate independently of said pinion. This pinion meshes with the mechanism which is to be driven—as, for instance, hoisting mechanism such as is used on traveling cranes. Formed upon the driving-shaft A and adjacent to the outer end of the sleeve portion of member B is a shoulder $a$, Fig. 2, and the distance between such end of said sleeve and said shoulder when the sleeve is in its innermost position is made less than the distance between the shoulders $b^4$ $c^4$ and the respective opposing ends $c^5$ $b^5$ of the member B and C when these shoulders and ends are farthest removed from each other, so that these shoulders and ends cannot abut even when the sleeve B is in innermost position. Not only, therefore, is there provided a limited movement of the sleeve B longitudinally of the axis of the driving-shaft, which longitudinal movement regulates the intimacy of contact of the friction devices $e^2$ and $e^4$ with the friction-faces $b'$ and $c'$, but also when the parts have become worn, due to frictional engagement, the sleeve B may be allowed to move far enough inward to provide efficient frictional contact between the faces $b'$ and $c'$ and the disks $e^2$ and $e^4$ without the abutting of the shoulders $b^4$ $c^4$ and the opposing ends $c^5$ $b^5$ before such contact takes place. The driving-shaft A is provided at its extreme end with screw-threads to accommodate a clamping-nut H, and these threads are extended slightly beyond the normally inner surface of said nut in order that the shaft A may be drawn through the pinion G or tightened up when necessary to compensate for wear upon the shoulder $a$ and the flange $c^2$. It will be noted that this is accomplished by the drawing up or tightening of the shaft A by means of the clamping-nut H, which tightening up results in drawing the shaft through the pinion G, and consequently through the member C, an amount equal to the wear that has been sustained by the shoulder $a$ and flange $c^2$. Suitable oil ducts and passages are provided for lubricating the respective bearings and journals, as shown.

It will be noted that the relative connections of the parts of the above-described device are as follows: The rotation of the driving-shaft A in either direction effects the rotation of the sleeve B in the same direction or the inward or outward movement of said sleeve longitudinally of the driving-shaft. The sleeve B is rotatably fixed relatively to the member C, but is movable longitudinally relatively to said member. The member C is fixed longitudinally of the driving-shaft, but is rotatably free therefrom. The pinion G is rotatably fixed to member C, but is rotatably free from the driving-shaft A. The juxtaposition of the flange $b$ with the friction device $e^2$ will effect the simultaneous rotation in the same direction of all the parts if the driving-shaft A is rotating in the direction indicated by the arrows in Figs. 1 and 2. If the driving-shaft is rotating in the opposite direction, such juxtaposition of the flange $b$ with the friction device $e^2$ will prevent the rotation of member C and pinion G, due to the inability of the ratchet-wheel to rotate in the reverse direction, and thus effect the outward movement of the sleeve B, releasing the friction devices and enabling the rotation of member B, and consequently of member C and pinion G, to be effected, due to the fixed rotatable relation of members B and C.

Let it be assumed that the pinion G is to be operated against a resistance, such as a weight to be raised, and that the friction devices are in a loose position relatively to each other. The motor is now operated so as to turn the driving-shaft A in the direction indicated by the arrows in Figs. 1 and 2. The thread of the shaft being right-handed, the sleeve B will as a result of such rotation be moved inwardly and its flange $b$ caused to intimately contact with the friction device $e^2$, and the close frictional engagement of the ratchet-wheel E, friction devices $e^4$ and $e^2$, and flanges $b$ and $c$ will be effected. This action will cause member C, and consequently pinion G, to rotate in the indicated direction and raise the weight to the required height, the pawl F, as will be noted from Figs. 1 and 3, therefore being caused to disengage from the ratchet-teeth by means of the frictional engagement of the plunger $f^4$ and stud $f^7$ laterally of the ratchet-wheel. When the weight has been raised, it is prevented from dropping by the said pawl, which immediately engages a tooth of the ratchet-wheel as soon as the operation of the motor is discontinued, such discontinuance being followed by a slight reverse movement of the ratchet-wheel and the consequent reëngagement of the pawls with the teeth, such reverse movement being effected by a short downward movement of the weight. When it is desired to lower a weight, the motor is reversed and caused to positively drive the shaft A in the direction opposite to that illustrated by the arrows in Figs. 1 and 2. This action effects the outward movement of the sleeve B and relieves the friction devices from their intimate contact with the ratchet-wheel, which, as will be noted, is prevented from rotating by the engagement of the pawls F with the ratchet-teeth. The release of the ratchet-wheel from the friction devices also frees the member C, so that the latter may rotate with the sleeve B and carry with it the pinion G, thus permitting the weight to fall. Should the rate of the fall be, however, such as to cause member C, and hence sleeve B, to rotate faster than the driving-shaft A, the sleeve B is actuated inwardly by reason of such increased speed of rotation and the friction devices are applied closely to the ratchet-wheel. The latter is, as above stated, prevented from rotating in a reverse direction, so that as soon as the friction devices are applied to the ratchet-wheel the member C is kept from rotating, and hence its tendency to race is checked. However, the continued rotation of the driving-shaft will again effect the outward movement of the sleeve B and the consequent release of the ratchet-wheel from the friction devices, which release again allows the member C and the pinion G to rotate to lower the load. A succession of operations as described will take place and effect the gradual lowering of the load without producing a forward movement of the motor, due to the tendency of the parts to race.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. In an automatic brake, the combination of a driving-shaft; a member screw-threaded thereon; a second member journaled on said shaft and fixed longitudinally thereof; and a device adapted to be actuated by the longitudinal movement of said first member to frictionally connect said two members.

2. In an automatic brake, the combination of a driving-shaft; a member screw-threaded thereon; a second member journaled on said shaft and rotatably fixed relatively to said first member; and a device adapted to be actuated by the longitudinal movement of said first member to frictionally connect said two members.

3. In an automatic brake, the combination of a driving-shaft provided with an externally-threaded portion; an internally-threaded member mounted upon the threaded portion of said driving-shaft and movable longitudinally of the axis of said shaft; a second member journaled upon said driving-shaft and rotatably fixed relatively to said first member; and a friction device actuated by the longitudinal movement of the latter for frictionally connecting said two members.

4. In an automatic brake, the combination of a driving-shaft provided with an externally-threaded portion; an internally-threaded member mounted upon the threaded portion of said driving-shaft and movable longitudinally of the axis of said shaft; a second member journaled upon said driving-shaft, fixed longitudinally of the axis thereof, and rotatably fixed relatively to said first member; and a friction device actuated by the longitudinal movement of the latter for frictionally connecting said two members.

5. In an automatic brake, the combination of a driving-shaft provided with an externally-threaded portion; an internally-threaded member mounted upon the threaded portion of said driving-shaft and movable longitudinally of the axis of said shaft; a second member journaled upon said driving-shaft and rotatably fixed relatively to said first member; friction devices actuated by the longitudinal movement of the latter; and a ratchet-wheel mounted intermediately of said two members and arranged to move in one direction of rotation of the shaft and fixed in the opposite direction.

6. In an automatic brake, the combination of a driving-shaft; a member mounted thereon and movable longitudinally of the axis thereof; means for causing such longitudinal movement; a second member journaled upon said shaft and fixed longitudinally of the axis thereof; said two members adapted to engage so as to be rotatably fixed relatively to each other; and friction devices mounted intermediately of said two members and actuated by the longitudinal movement of said first member.

7. In an automatic brake, the combination of a driving-shaft provided with an externally-threaded portion; an internally-threaded sleeve formed with a flange, engaging the threaded portion of said shaft, and having a limited movement longitudinally of the axis of the latter; a member journaled upon said driving-shaft, fixed longitudinally of the axis thereof, provided with a flange, and rotatably fixed relatively to said sleeve; and a ratchet-wheel and friction devices mounted intermediately of said flanges, said friction devices actuated by the longitudinal movement of said sleeve, and said ratchet-wheel arranged to move in one direction of rotation of the shaft and fixed in the opposite direction.

8. In an automatic brake, the combination of a driving-shaft provided with an externally-threaded portion; an internally-threaded sleeve formed with a flange, engaging the threaded portion of said shaft, and having a limited movement longitudinally of the axis of the latter; a member journaled upon said driving-shaft, fixed longitudinally of the axis thereof, provided with a flange, and engaging said sleeve so as to be rotatably fixed relatively thereto; a second member mounted intermediately of said flanges and arranged to move in one direction of rotation of said shaft and fixed in the opposite direction; friction devices mounted intermediately of said flanges respectively and said second member; and a pinion rotatably fixed relatively to said journaled member, and rotatable relatively to said shaft.

9. In an automatic brake, the combination of a driving-shaft provided with an externally-threaded portion; an internally-threaded sleeve mounted upon such threaded portion and provided with a flange; a member journaled to said driving-shaft and provided with a flange; a frame provided with bearings for said sleeve and journaled member; a disk mounted intermediately of said two flanges and provided with ratchet-teeth; friction devices mounted intermediately of said disk and said flanges respectively; a pawl having a fixed axis and arranged to engage said ratchet-teeth; and a pinion rotatably fixed to said journaled member, said sleeve and journaled member being rotatably fixed to each other, and arranged so that the former may have a limited movement longitudinally of the axis of the driving-shaft, said friction devices being actuated by the longitudinal movement of said sleeve.

10. In an automatic brake, the combination of a driving-shaft provided with an externally-threaded portion; an internally-threaded sleeve mounted upon such threaded portion and provided with a flange; a member journaled upon said driving-shaft; a member mounted intermediately of such sleeve and journaled member arranged to rotate in one direction of rotation of said driving-shaft, fixed in the opposite direction, and arranged to be frictionally engaged from opposite sides, said sleeve having a limited movement longitudinally of the axis of the driving-shaft, being rotatably fixed to said journaled member and separated from the latter a distance normally greater than the distance of such longitudinal movement.

11. In an automatic brake, the combination of a driving member; a driven member journaled thereon and fixed longitudinally thereof; a third member keyed to said driven member and longitudinally and rotatably movable with reference to said driving member; and a device adapted to be actuated by the longitudinal movement of said third member to frictionally connect said member with said driven member.

12. In an automatic brake, the combination with two rotatable members axially movable relatively to each other, of a friction-disk mounted therebetween and provided with ratchet-teeth and a flange on one side of said teeth, and a pawl having a fixed axis, one end of said pawl being adapted to engage said teeth and the other end to ride on said flange.

13. In an automatic brake, the combination of a driving-shaft; a member screw-threaded thereon; a second member journaled upon said shaft and keyed to said first member and a friction-disk mounted between said two members and provided with ratchet-teeth and a flange on one side of said teeth, and a pawl having a fixed axis, one end of said pawl being adapted to engage said teeth and the other end to ride on said flange.

Signed by me this 26th day of August, 1904.

GEORGE W. SHEM.

Attest:
G. W. SAYWELL,
A. E. MERKEL.